United States Patent Office 3,348,031
Patented Oct. 17, 1967

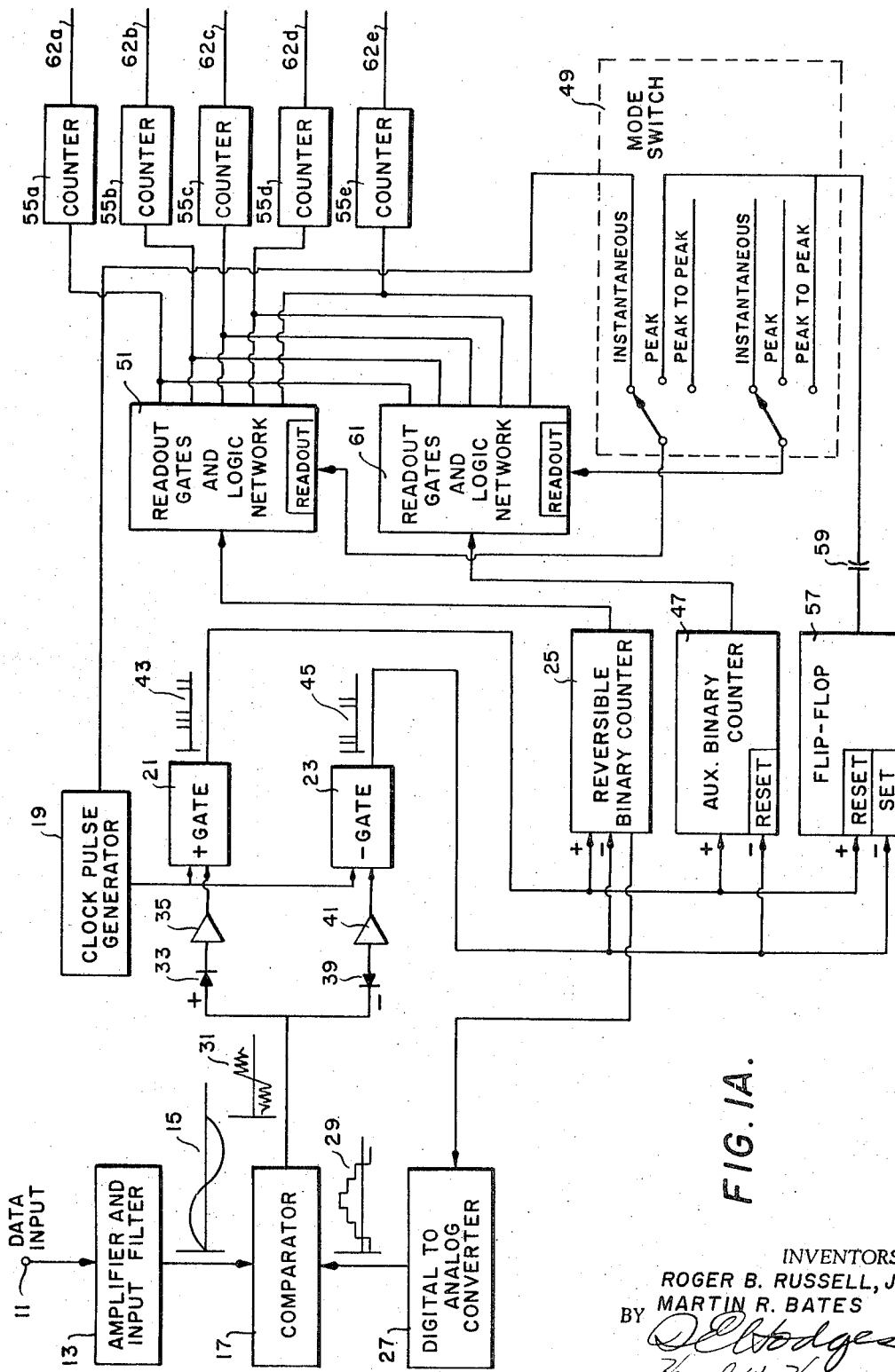
FIG. IA.
INVENTORS
ROGER B. RUSSELL, JR.
MARTIN R. BATES
ATTYS.

3,348,031
PROBABILITY ANALYZER
Roger B. Russell, Jr., Williamsville, and Martin R. Bates, Buffalo, N.Y., assignors, by mesne assignments, to the United States of America as represented by the Secretary of the Navy
Filed Dec. 5, 1963, Ser. No. 328,440
7 Claims. (Cl. 235—150.5)

ABSTRACT OF THE DISCLOSURE

The probability analyzer directly measures the peak to peak value, the peak value and the instantaneous value of the voltage analog input data and provides an output which is indicative of the number of cycles of input data which have measured values falling between each pair of a set of pairs of different amplitude levels and/or an output which is indicative of the number of cycles of input data having measured amplitudes which fall below each of a set of predetermined amplitude levels.

---

This invention relates to a device for data analysis, and more particularly relates to a device for directly measuring analogs of statistical parameters that are useful in determining the probability that cyclic type phenomena will obtain certain proportions.

It is frequently desirable to perform statistical analysis of various types of empirical data. The structural members of ships at sea and aircraft in flight, for example, are subjected to random stresses that can best be understood by a statistical analysis. Consequently, voltage analogs of structural motion, wind gusts, stress data and vibrational data are often obtained by direct measurement and analyzed by statistical methods so as to provide design information and information which indicates the probable failure of a structure ahead of time.

In particular, the statistical pattern of ship stress as well as the statistics of wave height can generally be fitted by the Rayleigh distribution. The probable maximum stress level that may reasonably be expected on a ship that is travelling at constant speed on a fixed course is easily predicted from simple statistical calculations based on this distribution as determined by stress measurements made for a time immediately preceding the prediction. However, these calculations are time consuming. Accordingly it is an object of this invention to provide a device for calculating statistical parameters automatically from an analog data input.

It is a further object of this invention to provide an apparatus which receives input data of a random nature and provides an output which is indicative of statistical parameters useful in analyzing the input data.

It is another object of this invention to provide a probability analyzer capable of measuring directly the peak-to-peak value, the peak value and the instantaneous value of voltage analog input data and which provides an output which is indicative of the number of cycles of input data which have measured values falling between each pair of a set of pairs of different amplitude levels, and/or an output which is indicative of the number of cycles of input data having measured amplitudes which fall below each of a set of predetermined amplitude levels.

It is another object of this invention to provide a probability analyzer which indicates three quantities:
(1) the total number of measured input cycles of data;
(2) the first moment, which is the sum, for each of the set of different amplitude thresholds (or for each set of different amplitude levels), of the number of measured cycles that fall between these thresholds multiplied by the mean magnitude between the same thresholds; and
(3) the second moment, which is the sum, for each of the set of different amplitude thresholds (or for each of the set of different amplitude levels), of the number of measured cycles that fall between these thresholds multiplied by the mean squared magnitude between the same thresholds.

Other objects and many of the attendant advantages of this invention will be readily appreciated as the same becomes better understood by reference to the following detailed description.

FIGS. 1A and 1B are a block diagram showing the relationship between the various components in an embodiment of the invention;

Figure 1B:
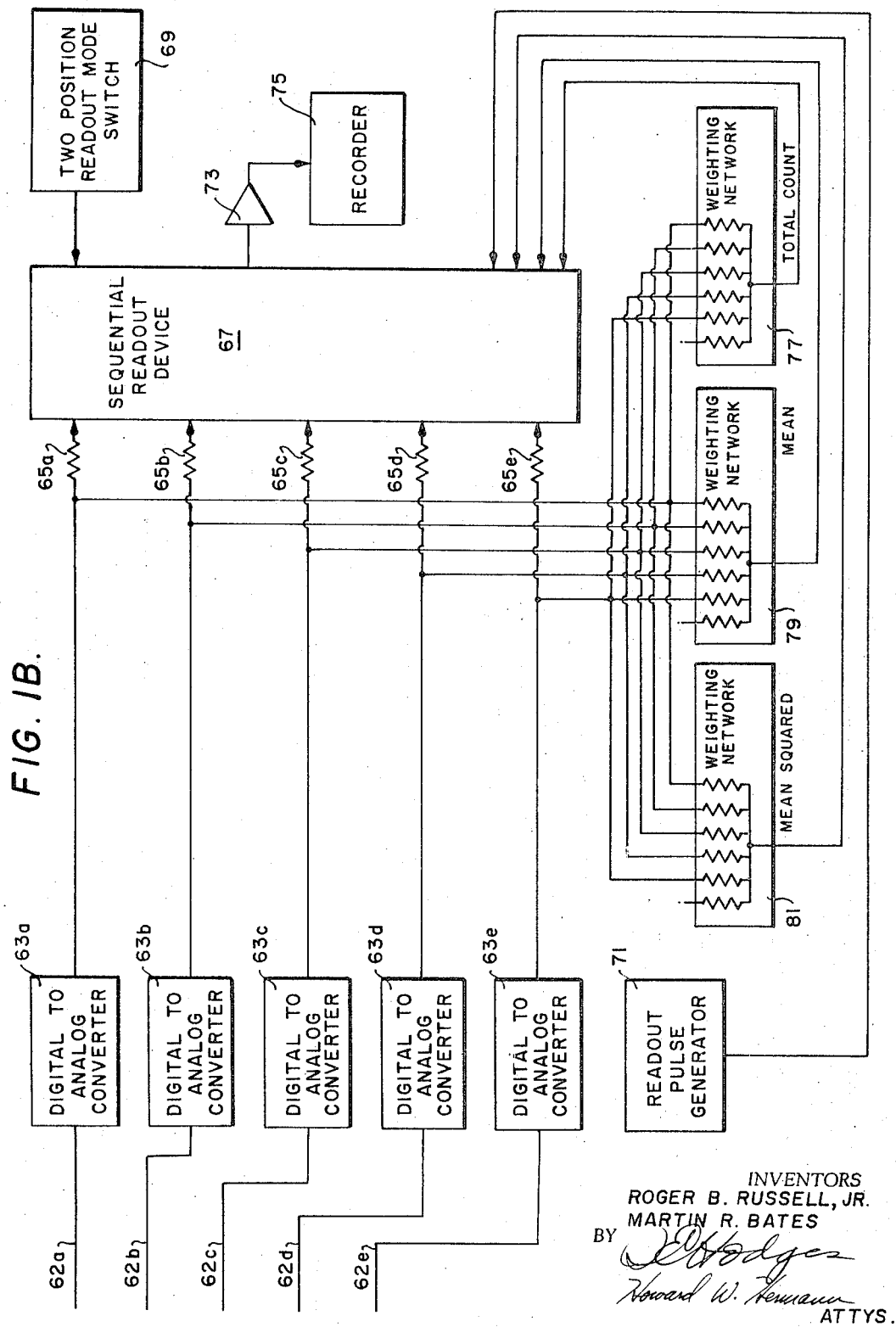

Referring now to the drawings, there is shown in FIGS. 1A and 1B a block diagram illustrative of an embodiment of the invention. In accordance with this embodiment, an electrical signal representative of data to be analyzed is received from any source from which it may be desirable to perform a statistical analysis. For example, the input data may be received directly from strain gage apparatus or other instrumentation. It may alternatively be data reproduced from a magnetic tape recording. The data may be representative, for example, of structural motion, wind gusts, stresses, or mechanical vibrations.

The system of the present invention receives the input data, analyzes it and records the analysis as an output. The recorder is preferably arranged to produce a histogram indicative of the number of cycles of data having amplitudes falling within or below certain predetermined limits as will be described in further detail hereinafter.

Referring now specifically to the system illustrated in FIGS. 1A and 1B an electrical signal representative of the data to be analyzed is fed into a data input terminal 11 from which it is transmitted to an input filter and amplifier stage 13. This unit includes a chopper-stabilized high-gain D.C. amplifier, a low pass filter and a high pass filter and will be described in greater detail with reference to FIG. 4.

The input filter and amplifier 13 are utilized to condition the signal for analysis by amplification and removing any unwanted signals. A typical waveform of the input filter output is shown in 15.

The amplified and filtered input is first fed into an amplitude measuring means which includes as its first element a comparator 17. A clock pulse generator 19 supplies pulses through a pair of gates 21, 23 to a reversible binary-counter 25 at the desired sampling rate for measuring and tracking the input signal 15. Reversible binary counters for this purpose are known in the art. For a discussion of such devices see Trent, Robert L., "A Transistor Reversible Binary Counter," Proceeding of the I.R.E., November 1952, page 1562 et seq. The rate of sampling may be adjusted as required depending on the type of input data being analysed.

The reversible binary counter 25 controls a digital-to-analog (d/a) converter 27 which applies an analog feedback voltage of opposite polarity, illustrated by curve 29, to comparator 17. As long as the signal 29 applied to the comparator by the d/a converter is less than the comparator input signal the comparator output signal 31 is positive and is passed by diode 33 of the plus line. Thereafter the signal is amplified by amplifier 35 and utilized by the plus gate 21 to allow clock pulses from the pulse generator 19 to be fed into the plus lines of the reversible binary counter 25. This is true until the signal output 29 of the d/a converter 27 becomes equal to the signal input 15 to the comparator, at which point the binary number in the plus line of the reversible binary counter 25 corresponds to the input voltage. Similarly, if the signal 29 fed back to the comparator exceeds the input signal 15 the minus gate 23 is actuated by means of reverse diode 39 and associated amplifier 41 so that clock pulses from the clock pulse generator 19 are fed to the minus line of the reversible binary counter 25 causing the count to be reduced. The d/a converter 27 thereby provides a reduced output to the comparator 17, tending always to equal the input signal. Since the signal out of the d/a converter 27 changes by discrete steps each corresponding to a count of one in the reversible binary counter, a dead space is incorporated in the comparator to prevent the comparator from hunting between two levels when the input voltage is not precisely equal to the feedback voltage. Thus the input must change by slightly more than the equivalent of one count before a pulse is permitted to update the binary counters.

The outputs 43, 45 of the plus and minus gates 21, 23, respectively, are fed to both the reversible binary counter 25 and an auxiliary binary counter 47, the positive pulses being fed to the positive lines of the counters and the negative pulses to the negative lines of the counters. Both binary counters 25 and 47 will count the positive pulses applied to their input terminals. The count in counter 25 will, of course, be proportional to the input voltage amplitude. The negative pulses applied to the negative terminal of the counter 25 will cause the counter to count in the opposite direction from the direction resulting from positive input pulses. However, the negative pulses 45 which are applied to the negative terminal of the auxiliary binary counter 47 cause this counter to be reset. The analog feedback from the digital to analog converter acts to force the reversible binary counter 25 to a pulse count that is continuously proportional to the input voltage. The count in the auxiliary binary counter 47, however, is equal to the number of positive pulse counts accumulated in the reversible binary counter. Hence the auxiliary binary counter 47 will count from the minimum voltage of the input data to its maximum value and then be reset. Thus it will count a number which is proportional to the maximum change in voltage representative of the input data, or the peak-to-peak amplitude of the input voltage.

As was stated previously the system may be operated in three distinct modes of analysis as desired: (1) Instantaneous, which measures the time duration of the signal between each of a plurality of pairs of thresholds; (2) peak, which counts the number of cycles whose peak amplitudes fall between each of a plurality of pairs of thresholds; and (3) peak-to-peak, which counts the number of cycles whose peak-to-peak amplitudes fall between each of a plurality of pairs of thresholds. To this end there is provided a mode switch 49 which may be manually positioned for the desired mode of analysis.

In the instantaneous mode the output of the clock pulse generator 19 is connected by the mode switch 49 to a plurality of readout gates 51 which are also connected to the output of the reversible binary counter 25. The output of the reversible binary counter 25 is sampled whenever the clock pulse generator 19 emits a pulse. The readout gates also include selection means in the form of a logic network for classifying the input signals from the counter 25, according to their amplitudes. The gates and logic network provide a plurality of outputs, each corresponding to one pair of thresholds representative of the instantaneous amplitude of the input signal at the time of sampling. Each sampling then provides an output count to one of a plurality of counter 55a–e.

In the peak mode, the output of the reversible binary counter 25 is sampled only at the first negative input pulse following a positive input pulse. The count at that point, indicative of a peak input signal amplitude, is read out through readout gates 51 and applied to the one of readout counters 55a–e which is indicative of that amplitude. This is accomplished by means of a flip flop 57 connected to the positive and negative input lines to the reversible binary counter 25 and the auxiliary binary counter 47 and having its output connected through a capacitor 59 and the mode switch 49 to the readout terminal of the readout gate system 51. The flip flop 57 is set by negative pulses on the input to the reversible binary counter 25 and reset by a positive pulse on the input. Thus, until a maximum system input signal amplitude is indicated by a change from positive to negative pulses at the input to the reversible binary counter 37, the flip flop 57 blocks the input pulses from presenting a readout pulse to the readout gates 51.

In the peak-to-peak mode the mode switch 49 connects the flip flop 57 via its capacitor 59 to the readout terminal of a set of readout gates and logic networks 61 associated with the auxiliary binary counter 47 and having its outputs also connected to the output counters 55a–e. Again due to the action of the flip flop 57, samples will be taken only upon application of a positive reset pulse following one or more negative pulses in the same manner as hereinbefore described with respect to the peak mode. However, since the output of the flip flop 57 is now applied to the auxiliary binary counter 47 and the pulse count in the auxiliary binary counter is indicative of the peak-to-peak amplitude of the system input signal, the output upon readout is also indicative of the peak-to-peak amplitude of the input signal. Again a pulse is applied to the one of counters 55a–e which is indicative of the amplitude, in this case peak-to-peak of the input signal.

Each pulse in the counters 55a–e represents either the instantaneous value of the amplitude of the input data, the peak value of a cycle of input data, or the peak-to-peak value of a cycle of input data, depending on the position of the mode switch 49. Each counter counts only the number of pulses representative of sampling which fall in a predetermined range of amplitude of system input data signals.

The counters 55a–e are each electrically connected via one of a plurality of lines 62a–e to a corresponding one of a plurality of digital-to-analog converters 63a–e, respectively. The digital-to-analog converters 63a–e may be seen from FIG. 1B which illustrates the computer means and output portion of the system. These d/a converters each provide an output voltage which is proportional to the number of counts accumulated by their respective counter 55a–e. The output voltages of the d/a converters 63a–e are fed through series resistors 65a–e to a sequential readout device 67, which comprises a stepping switch.

The sequential readout device 67 is provided with circuitry for use in two different modes of operation as chosen by a two-position readout mode switch 69. In the first mode, or "between" mode, the sequential readout device is set to produce an output from the system which is indicative of the number of cycles of input data which have amplitudes (instantaneous, peak, or peak-to-peak) falling between different pairs of different preset amplitude levels. In the second, or "below," mode the sequential readout device 67 is set to produce an output from the system which is indicative of the number of cycles of input data which have amplitudes falling below each of a set of different preset amplitude levels. For control of the sequential readout device 67 that is also connected thereto a readout pulse generator 71. The frequency of the readout pulse generator 71 determines the number of cycles of input data which will be analyzed before the results are read out by the sequential readout device 67.

Figure 2:
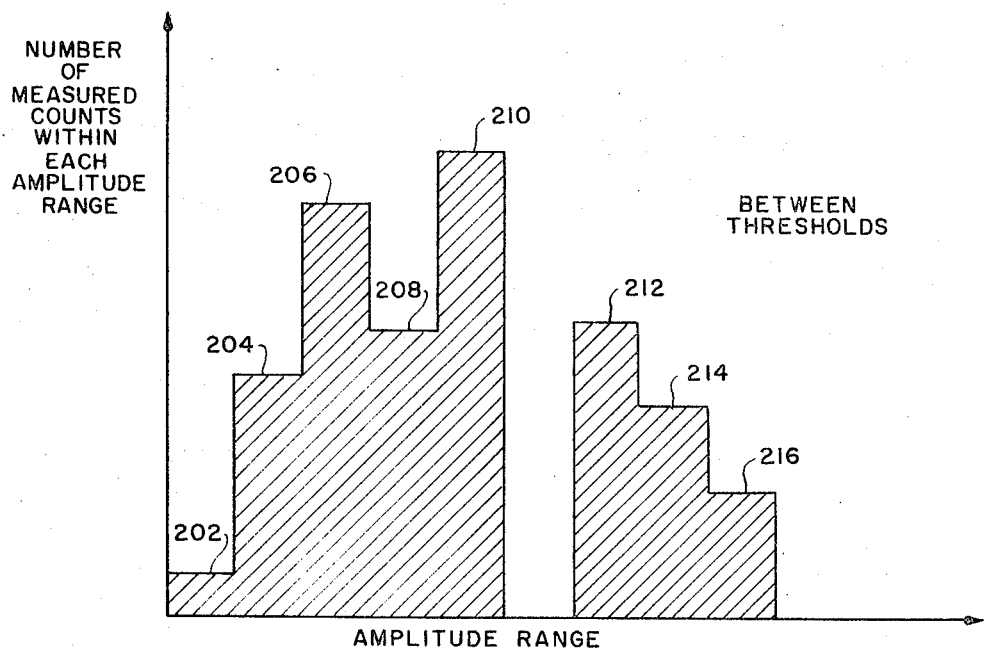
FIG. 2 is a simplified graph of an output of an illustrative embodiment of the invention showing a histogram of the number of cycles of input data that fall between each pair of fixed thresholds and auxiliary computations.

When the two-position readout mode switch 69 is in the "between" position the outputs of the d/a converters 63a–e are each sequentially connected, upon application of a readout pulse from the readout pulse generator 71, to a summing amplifier 73 having its output connected to a recorder 75. The recorder 75 records the output of each of the digital-to-analog converters as an amplitude modulated line to form a series of frequency rectangles as shown in the histogram of FIG. 2. The top lines in 202, 204, 206, 208, and 210 in the histogram of FIG. 2 are indicative of the number of counts in each of the counters 63a, 63b, 63c, 63d, and 63e, respectively. This histogram indicates the frequency distribution of the amplitude of the voltage signal representing input data which were supplied to the system.

In the "below" mode the outputs of the d/a converters 63a–e are connected through resistors 65a–e to the summing amplifier in groups. Upon receipt of the first readout pulse from generator 71, the output of the lowest amplitude level d/a converter 63a is connected to the summing amplifier which provides an output voltage to the recorder 75 which records the voltage as indicative of the number of cycles falling below the lowest threshold level. Upon receipt of the next pulse the output of the second d/a converter 63b is connected to the summing amplifier 73 along with the output of the first d/a converter 63a. The amplifier adds the two signals and transmits their sum to the recorders 75. This summing process is continued until finally the total of all counters is read and recorded. The output of the amplifiers 73 is in each instance proportional to the number of cycles (or sampling times in the instantaneous mode) in which the input data amplitude is below that level which is represented by the highest order counter 63a–e which has been read out in the particular readout cycle.

Figure 3:
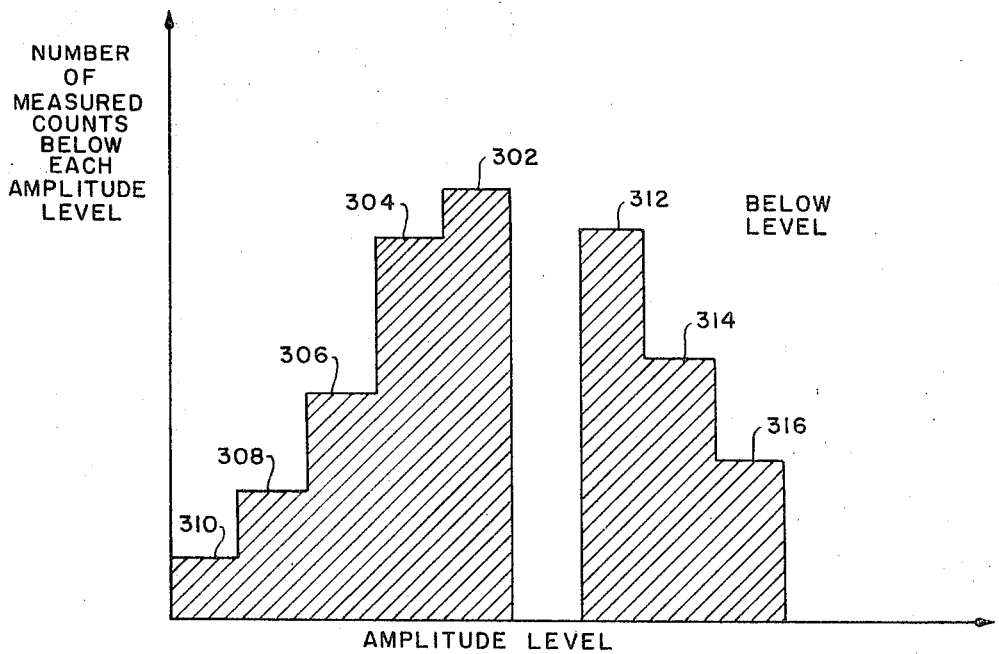
FIG. 3 is a simplified graph of an output of an illustrative embodiment of the invention showing a histogram of the numbuer of cycles of input data that fell below each fixed amplitude level and certain auxiliary computations.

The type of output obtained on the recorder 75 in the "below" readout mode is represented in the histogram of FIG. 3 wherein the top lines 302, 304, 306, 308, and 310 represent the outputs of the d/a converters 63a–e, 63a–d, 63a–c, 63a–b, and 63a, respectively. The frequency rectangles thus indicate the number of amplitude measurements of input data voltage which fall below each of the predetermined levels.

In both readout modes provision is also made for performing certain auxiliary computations after the direct readout has been completed and thereby minimize manual data analysis. The outputs of the d/a converters 63a–e are connected to a plurality of weighting networks 77, 79, and 81 which have their outputs connected to the sequential readout device 67 so that they may also be switched to the summing amplifier 73 and its associated output recorder 75.

Considering first the weighting network 77, each of the outputs of the d/a converters 63a–e is connected to one of a set of equal summing resistors in the weighting network to yield an analog voltage proportional to the sum of the counts in all the counters.

After the output of the total count weighting network 77 has been applied to the output amplifier 73 and its output recorder 75, the sequential readout device 67 next steps to read the output of the mean weighting network 79. In this weighting network the d/a converters 63a–e are each connected to individual fixed summing resistors having resistances which are inversely proportional to the mean level corresponding to the amplitude range represented by each of the counters 55a–e. The resulting sum voltage which is applied to the system output is therefore proportional to the accumulated product of the number of counts in each counter multiplied by the mean level of amplitude of the input signal corresponding to that counter.

When the sequential readout device 67 connects the mean-squared weighting network 81 to the system output the outputs of the d/a converters 63a–e are connected to the summing amplifier 73 through a set of individual fixed summing resistors having resistances which are inversely proportional to the mean-squared level corresponding to each of the counters 55a–e. The resulting weighted sum is proportional to the accumulated product of the number of counts in each counter multiplied by the mean-squared level for that counter.

Histograms of the computed outputs of the system are illustrated in FIGS. 2 and 3 wherein the lines 212, 214, and 216 represent the total count, mean level, and mean squared level respectively of a set of input data and the lines 312, 314, and 316 are representative of a different set of input data. It must be realized that the scale of the calculated histograms is different from the scale of the histograms of the individual outputs. The difference is necessary due to the fact that a total count of all counters is involved in the calculated histograms. The calculations shown by the histograms of FIGS. 2 and 3 are sufficient to characterize many common probability functions.

Figure 4:
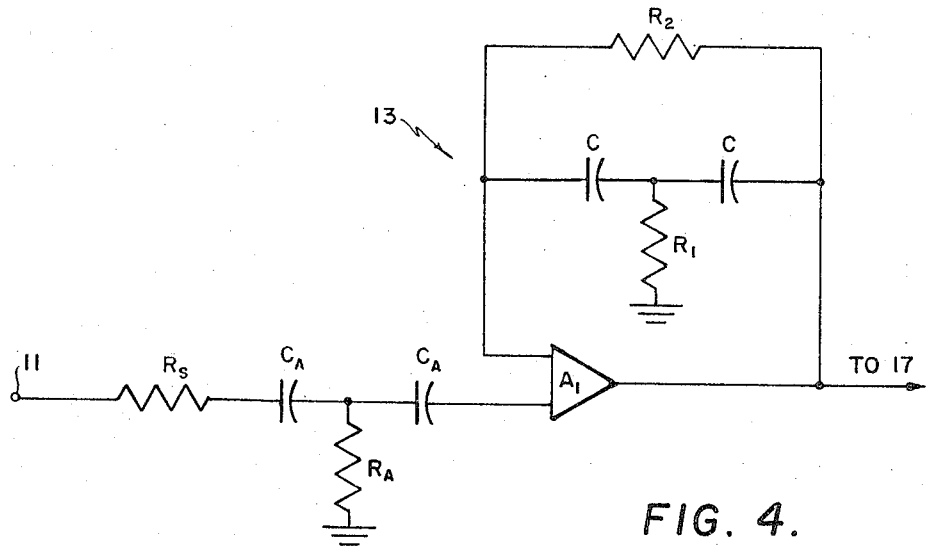
FIG. 4 is a schematic circuit diagram of an amplifier and input filter used in a representative embodiment of the invention as shown in FIGS. 1A and 1B.

Referring now to FIG. 4, there is shown a representative specific embodiment of the amplifier and input filter 13 shown in FIG. 1. The input signal to the system is applied to the terminal 11 and is passed through a filter network, consisting of a series resistor $R_s$, a pair of series capacitors $C_A$ having a ground connection at their junction through a resistor $R_A$, to the input of an operational amplifier $A_1$. The amplifier $A_1$ in the embodiment is a chopper-stabilized high gain DC amplifier with stable gain and low drift. A satisfactory commercially available amplifier was a transistorized unit built by Burr Brown Research Corporation. This unit had an open loop gain of about $10^6$ at DC, a typical drift of 1 to 3 millivolts at ordinary laboratory ambient temperatures and input and feedback impedances of less than 100,000 ohms.

Two parallel feedback loops are provided for the amplifier $A_1$. One loop consists of series capacitances $C$ having their junction tied to ground through a resistor $R_1$; the other loop consists of a resistor $R_2$. The output of the unit is applied to the comparator 17.

Typical circuit component values for the signal conditioning filter of FIG. 4 are:

| | | |
|---|---|---|
| $R_S$ | ohms | 10K |
| $C_A$ | mfds | .5 |
| $R_A$ | ohms | 100K |
| $R_2$ | megohms | 1 |
| $C$ | mfds | .1 |
| $R_1$ | ohms | 500K |

A circuit utilizing in these circuit values and the aforementioned Burr-Brown amplifier yielded a second order cutoff near 2.5 c.p.s. and a first order cutoff near 60 c.p.s.

If desired, other signal conditioning filters can be used. For examples, see Korn and Korn, Electronics Analog Computers, McGraw-Hill, 2nd ed. 1956, table 3, pp. 417–422.

Figure 5:
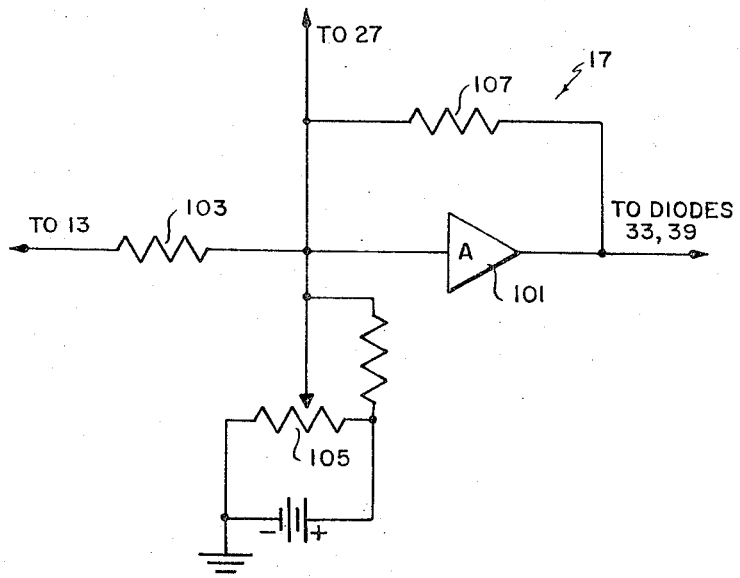
FIG. 5 is a schematic circuit diagram of a comparator used in a representative embodiment of the invention as shown in FIGS. 1A and 1B.

An example of a suitable comparator 17 is shown in greater detail in FIG. 5. In this circuit the analog feedback from the digital-to-analog converter 27 is fed to the input of an operational amplifier 101. The output of the input filter network 13 is also applied, through a series resistor 103, to the input of the operational amplifier 101. A DC offset voltage is supplied to the amplifier by means of a potentiometer, or the like, 105. By use of a feedback loop including a feedback resistor 107, the amplifier 101 produces a signal output which is proportional to the amplitude difference between the two input signal output is transmitted to the diodes 33, 39 where, depending on its polarity it is passed by the diodes to either of amplifiers 35 or 41 and one of their associated gates 21, 23 respectively. Typical component values for the circuit shown in FIG. 5 are: Resistor 103=5 kilohms, resistor 107=62 kilohms, used with a Burr-Brown operational amplifier of the type described with reference to FIG. 4 for the amplifier 101.

The remaining component circuits may be of any conventional type for performing their indicated functions. Since specific circuitry for performing these functions will be known to those skilled in the art, they need not be described in detail here.

Thus there has been described a system which is useful in statistically analyzing either "live" or recorded analog input data. Operated in conjunction with a recorder it can plot histograms of the data fed into the system. Its use simplifies statistical analysis of cyclic type data in order, for example, to obtain design information which indicates probable failure of a structure before actual failure thereof.

Obviously many modifications and variations of the invention are possible in the light of the above teachings. It is therefore to be understood that within the scope of the appended claims the invention may be practiced otherwise than as specifically described.

What is claimed is:

1. A probability analyzer comprising:
analyzer input-terminal means for receiving data of a cyclic nature in the form of electrical voltages;
measuring means, electrically connected to said input-terminal means, for determining the amplitude of said cyclic data at predetermined intervals of time;
a plurality of classification terminals arranged so that each terminal corresponds to a range of amplitudes;
selection means, electrically connected to said measuring means and to said plurality of classification terminals, for pulsing the classification terminal that corresponds to the range of amplitudes within which the amplitude of said cyclic data falls as determined by said measuring means during a plurality of said predetermined intervals of time; and
computer means, electrically connected to said plurality of classification terminals, for providing a voltage output in which the amplitude of the voltage varies in proportion to the sum of said classification-voltage output pulses provided at each of said plurality of classification terminals by said selection means.

2. A probability analyzer comprising:
analyzer input-terminal means for receiving data of a cyclic nature in the form of electrical voltages;
measuring means, electrically connected to said input-terminal means, for determining the amplitude of said cyclic data at predetermined intervals of time;
a plurality of classification terminals arranged so that each terminal corresponds to a range of amplitudes;
selection means, electrically connected to said measuring means and to said plurality of classification terminals, for pulsing the classification terminal that corresponds to the range of amplitudes within which the amplitude of said cyclic data falls as determined by said measuring means during a plurality of said predetermined intervals of time;
computer means, electrically connected to said plurality of classification terminals, for providing a voltage output in which the amplitude of the voltage varies in proportion to the sum of said classification-voltage output pulses provided at each of said plurality of classification terminals by said selection means; and
recorder means, electrically connected to said computer means, for making a variable amplitude recording of said computer output voltage, whereby a histogram is plotted in which the width of each frequency rectangle indicates the magnitude of one of said amplitude ranges and the height of said frequency rectangle indicates the number of said classification voltage output pulses.

3. A probability analyzer according to claim 2 in which said measuring means comprises:
comparator means, having a first input connected to said analyzer input-terminal means and having a second input, for providing a voltage pulse at its output of one polarity when the voltage applied to said first input is less in amplitude than the voltage applied to said second input and for providing a voltage pulse at its output of the opposite polarity when the voltage applied to said first input is greater in amplitude than the voltage applied to said second input;
gating means connected to said comparator means for periodically gating said voltage pulses from said comparator means;
counter means, connected to said gating means, for counting said pulses of one polarity in one direction and said pulses of the opposite polarity in the other direction; and
digital-to-analog converter means, having its input connected to said counter means and its output connected to said second input of said comparator means, for converting the count of said counter means to a voltage which varies in amplitude with the count, whereby said measuring means generates pulses of one polarity when said voltage applied to said analyzer input-terminal means is decreasing and pulses of the opposite polarity when said voltage applied to said analyzer input-terminal means is increasing.

4. A probability analyzer comprising:
analyzer input-terminal means for receiving data of a cyclic nature in the form of electrical voltages;
measuring means, electrically connected to said input-terminal means, for determining the amplitude of said cyclic data at predetermined intervals of time;
a plurality of classification terminals arranged so that each terminal corresponds to an amplitude level;
selection means, electrically connected to said measuring means and to said plurality of classificaiton terminals, for pulsing the classification terminals that correspond to the amplitude level below which the amplitude of said cyclic data falls as determined by said measuring means during a plurality of said predetermined intervals of time; and
computer means, electrically connected to said plurality of classification terminals, for providing a voltage output in which the amplitude of the voltage varies in proportion to the sum of said classification-voltage output pulses provided at each of said plurality of classification terminals by said selection means.

5. A probability analyzer comprising:
analyzer input-terminal means for receiving data of a cyclic nature in the form of electrical voltages;
measuring means, electrically connected to said input terminal means, for determining the amplitude of said cyclic data at predetermined intervals of time;
a plurality of classification terminals arranged so that each terminal corresponds to a range of amplitudes;
selection means, electrically connected to said measuring means and to said plurality of classification terminals, for pulsing the classification terminal that corresponds to the range of amplitudes within which the amplitude of said cyclic data falls as determined by said measuring means during each of said predetermined intervals of time; and
computer means, electrically connected to said plurality of classification terminals, for providing a voltage output in which the amplitude of the voltage varies in proportion to the sum of said classification-voltage output pulses provided at each of said plurality of classification terminals by said selection means.

6. A probability analyzer comprising:
analyzer input-terminal means for receiving data of a cyclic nature in the form of electrical voltages;
measuring means, electrically connected to said analyzer input-terminal means, for determining the peak value of each cycle of said data;
a plurality of classification terminals arranged so that each classification terminal corresponds to a range of peak values of said data;

selection means, electrically connected to said measuring means and to said plurality of classification terminals, for providing one voltage output pulse for each cycle of input data at the classification terminal which corresponds to the range of peak voltages of said cycle of input data; and computer means, electrically connected to said plurality of classification terminals, for providing a voltage output in which the amplitude of the voltage varies in proportion to the sum of said classification-voltage output pulses provided at each of said plurality of classification terminals by said selection means.

7. A probability analyzer comprising:

analyzer input-terminal means for receiving data of a cyclic nature in the form of electrical voltages;

measuring means, electrically connected to said analyzer input terminal means, for determining the peak-to-peak value of each cycle of said data;

a plurality of classification terminals arranged so that each classification terminal corresponds to a range of peak-to-peak values of said data;

selection means electrically connected to said measuring means and to said plurality of classification terminals, for providing one voltage output pulse for each cycle of input data at the classification terminal which corresponds to the range of peak-to-peak voltages of said cycle of input data; and computer means, electrically connected to said plurality of classification terminals, for providing a voltage output in which the amplitude of the voltage varies in proportion to the sum of said classification-voltage output pulses provided at each of said plurality of classification terminals by said selection means.

References Cited

UNITED STATES PATENTS

| | | | |
|---|---|---|---|
| 2,927,207 | 3/1960 | Fiehrer et al. | 328—151 X |
| 3,116,458 | 12/1963 | Margopoulos | 328—151 X |
| 3,125,721 | 3/1964 | Schumann | 328—151 X |
| 3,209,256 | 9/1965 | Slawsky | 328—151 X |

MALCOLM A. MORRISON, *Primary Examiner.*

J. RUGGIERO, *Assistant Examiner.*